United States Patent [19]

Stone

[11] 4,018,480
[45] Apr. 19, 1977

[54] GRANULAR-FLOOR SUPPORTED CARGO HAULING TRAILER APPARATUS CONSTRUCTION

[76] Inventor: Jack C. Stone, 2018 SW. 15, Oklahoma City, Okla. 73108

[22] Filed: Aug. 25, 1975

[21] Appl. No.: 607,691

Related U.S. Application Data

[63] Continuation-in-part of Ser. No. 423,316, Dec. 10, 1973, Pat. No. 3,901,552.

[52] U.S. Cl. .............................. 298/27; 105/243; 105/363; 296/28 K
[51] Int. Cl.² .......................................... B60P 1/56
[58] Field of Search ............ 296/28 R; 298/28, 24, 298/29, 27, 30, 31, 32, 33, 34, 35 R, 35 M, 36, 37; 105/363, 243, 247–257

[56] References Cited

UNITED STATES PATENTS

| | | | |
|---|---|---|---|
| 1,398,386 | 11/1921 | McRae | 105/363 |
| 2,540,859 | 2/1951 | Birkin | 296/28 K X |
| 3,101,150 | 8/1963 | Janson et al. | 296/28 K X |
| 3,692,363 | 9/1972 | Tenebaum et al. | 298/24 |
| 3,738,511 | 6/1973 | Lemon et al. | 105/243 X |
| 3,756,469 | 9/1973 | Clark et al. | 105/243 X |

*Primary Examiner*—Frank E. Werner
*Attorney, Agent, or Firm*—Dunlap, Codding and McCarthy

[57] ABSTRACT

An improved trailer convertible to one position for hauling floor supported cargo and to one other position for hauling granular material. The trailer has a floor assembly including; a pair of center floor panels which are supported on the trailer frame and form a portion of the floor supporting structure in one position and which are removable and positionable for cooperating to retain granular material in one other position; and a pair of end slope members which are removably connectable to the trailer for cooperating with the center floor panels and portions of the trailer sides to retain granular material. The trailer is adapted such that preconstructed sections of the trailer can be shipped and assembled at a remote location.

13 Claims, 11 Drawing Figures

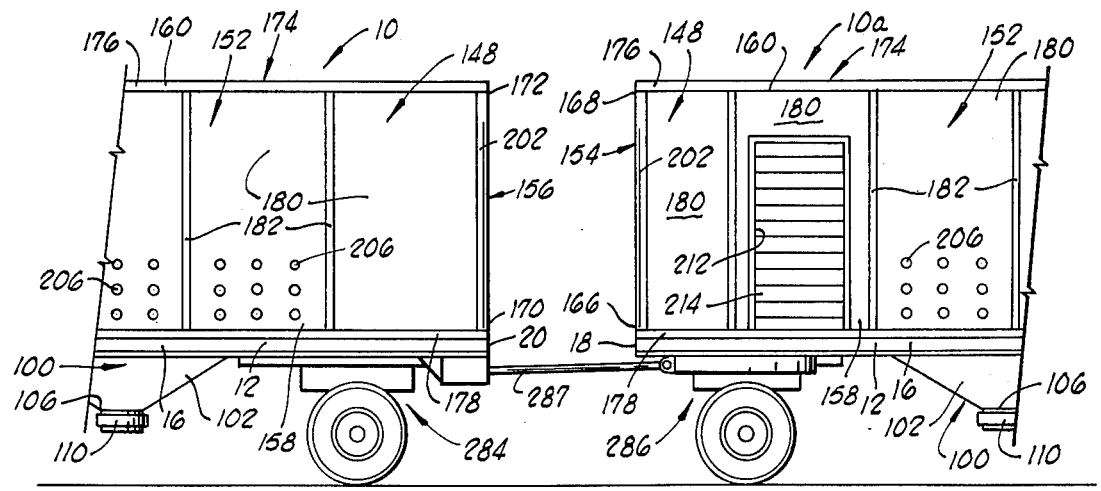
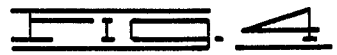
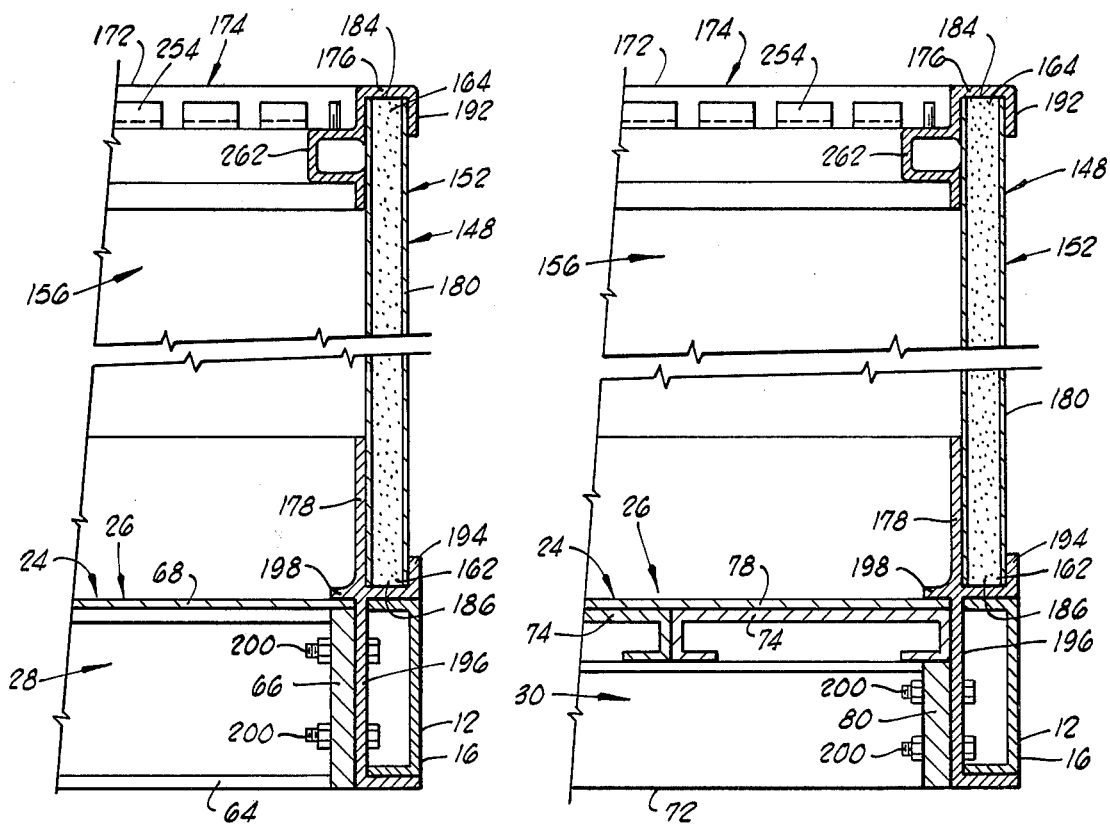
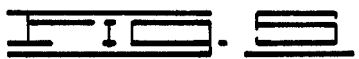  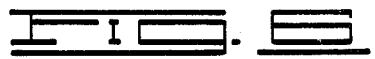

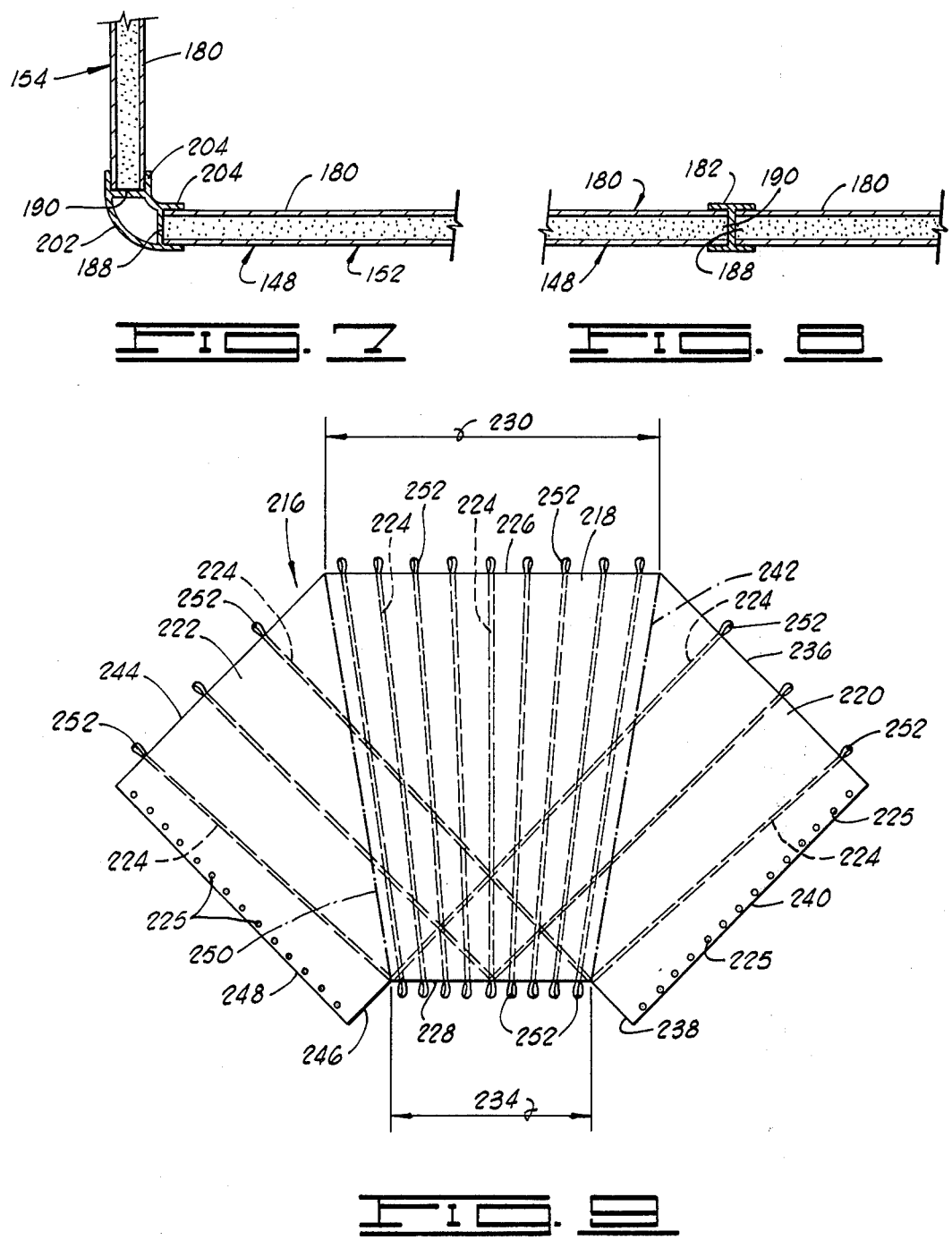

GRANULAR-FLOOR SUPPORTED CARGO HAULING TRAILER APPARATUS CONSTRUCTION

CROSS-REFERENCE TO RELATED APPLICATIONS

The present application is a continuation-in-part of the Applicant's co-pending application entitled "Granular-Floor Supported Cargo Hauling Trailer Apparatus," Ser. No. 423,316, filed on Dec. 10, 1973, now U.S. Pat. No. 3,901,552.

BRIEF DESCRIPTION OF THE DRAWINGS

FIG. 4 is a fragmentary side elevational view showing a portion of the trailer of FIG. 1 connected in tandem to a similar trailer.

FIG. 5 is a partial sectional view, taken substantially along the lines 5—5 of FIG. 3.

FIG. 6 is a partial sectional view, taken substantially along the lines 6—6 of FIG. 3.

FIG. 7 is a partial sectional view, taken substantially along the lines 7—7 of FIG. 1.

FIG. 8 is a partial sectional view, taken substantially along the lines 8—8 of FIG. 1.

FIG. 9 is a top plan view of an end slope member which is removably connectable to the trailer of the present invention.

DESCRIPTION OF THE PREFERRED EMBODIMENT

Figure 1:
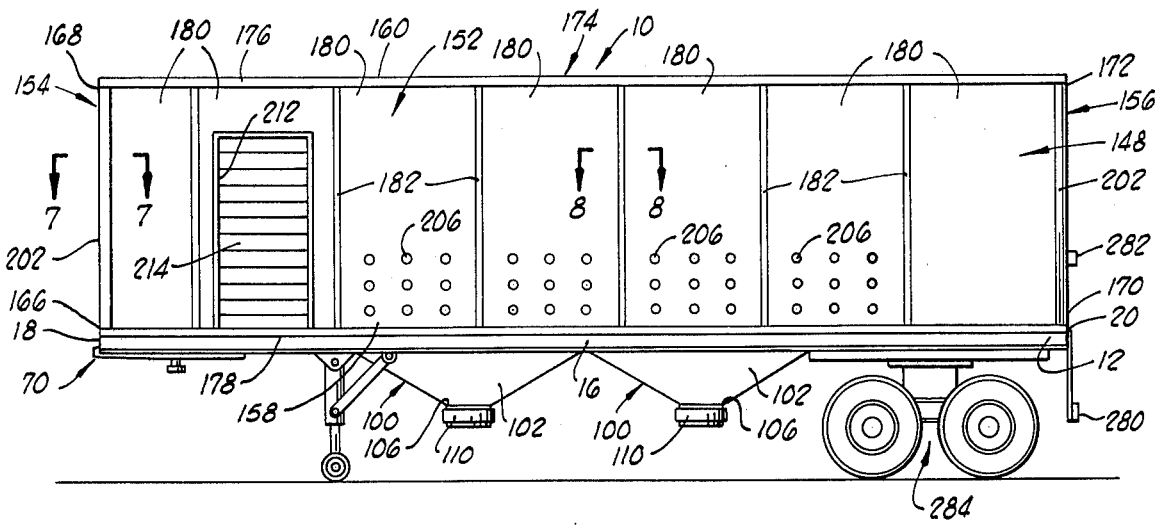
FIG. 1 is a side elevational view of a trailer constructed in accordance with the present invention.

Referring to the drawings in general and to FIG. 1 in particular, shown therein and designated by the general reference numeral 10 is a trailer connectable in an assembled position to a truck tractor. The trailer 10 is constructed in accordance with the present invention and is positionable in granular material hauling and floor supported cargo hauling positions such that the trailer 10 can receive and be utilized to transport floor supported cargoes such as cattle or the like, for example, generally requiring a ventilated type of trailer construction and such that the trailer 10 can receive and be utilized to transport granular material such as sugar, grain and the like, for example, generally requiring a storage material bin space communicating with a hopper assembly or the like for unloading the transported, stored granular material. The trailer 10 is, more particularly, connectable to a conventional, tiltable fifth wheel assembly of the truck tractor so that the trailer 10 can be transported from one location to another via the truck tractor in a conventional manner well-known in the art, (the truck tractor and associated fifth wheel assembly are not shown in the drawings).

It should be noted that the term "floor supported cargo" is utilized herein to refer generally to a class of cargo requiring a floor or platform type of structure upon which the cargo may be placed and supported during the transportation thereof. The present invention is particularly adaptable and suitable for hauling floor supported cargo of the type requiring ventilation, generally provided via ventilation openings in the trailer wall assembly, for example.

Shown in FIG. 4, is a modified trailer 10a constructed to be towed in tandem by the trailer 10. The trailer 10a is contructed exactly the same as the trailer 10 except the structure for connecting the trailer 10 to the tiltable fifth wheel assembly of the truck tractor is replaced with a structure such that the trailer 10a is self-supported for being towed by the trailer 10 in a manner that is well-known in the art. Each of the trailers 10 and 10a utilize a similar floor assembly constructed to cooperate with the ventilated trailer walls for positioning the trailers 10 and 10a in granular material and floor supported cargo hauling positions. Therefore, the present invention will initially be described with respect to the trailer 10.

Referring more particularly to the construction of the trailer 10, the trailer 10 includes a trailer frame 12 having a first side 14, a second side 16, a forward end 18 and a rearward end 20. One end of the first side 14 is connected to one end of the forward end 18 and the opposite end of the first side 14 is connected to one end of the rearward end 20. One end of the second side 16 is connected to the end of the forward end 18, opposite the end thereof connected to the first side 14, and the opposite end of the second side 16 is connected to the end of the rearward end 20, opposite the end of the rearward end 20 connected to the first side 14.

The trailer frame 12 is thus connected such that the first and second sides 14 and 16 extend in substantially parallel vertical planes and the first and second sides 14 and 16 are each disposed and supported in a substantially coplanar horizontal disposition. The forward and the rearward ends 18 and 20 are spaced apart a predetermined distance substantially corresponding to the length of the first and second sides 14 and 16, the forward and rearward ends 18 and 20 each extending in substantially parallel vertical planes and each being disposed in a substantially coplanar horizontal disposition.

The first and the second sides 14 and 16 and the forward and rearward ends 18 and 20 provide the basic supporting structure for the trailer 10, the first and second sides 14 and 16 being spaced apart a predetermined distance and the forward and the rearward ends 18 and 20 being spaced apart a predetermined distance forming a generally rectangularly shaped trailer frame 12 and defining a trailer frame opening 22 extending between the first and second sides 14 and 16 and the forward and rearward ends 18 and 20.

Figure 2:
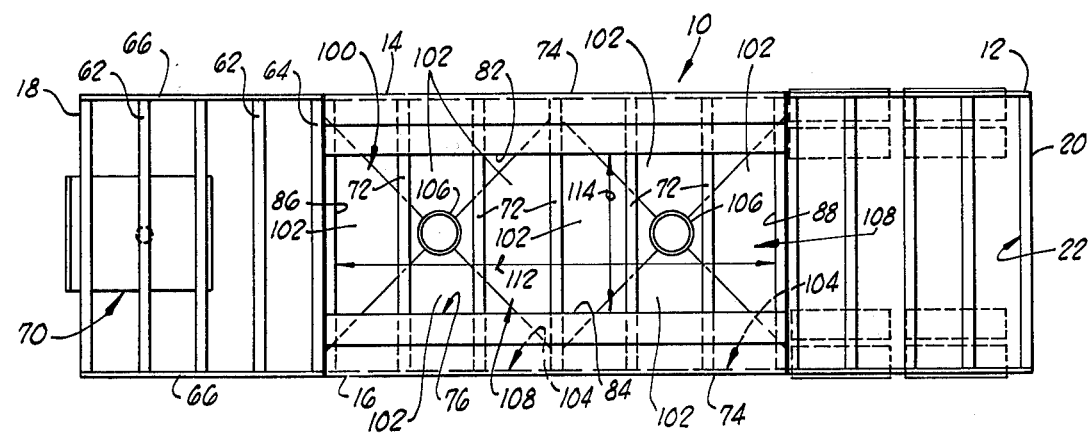
FIG. 2 is a top plan view of the floor assembly of the trailer of FIG. 1 shown in the granular material hauling position.
Figure 3:
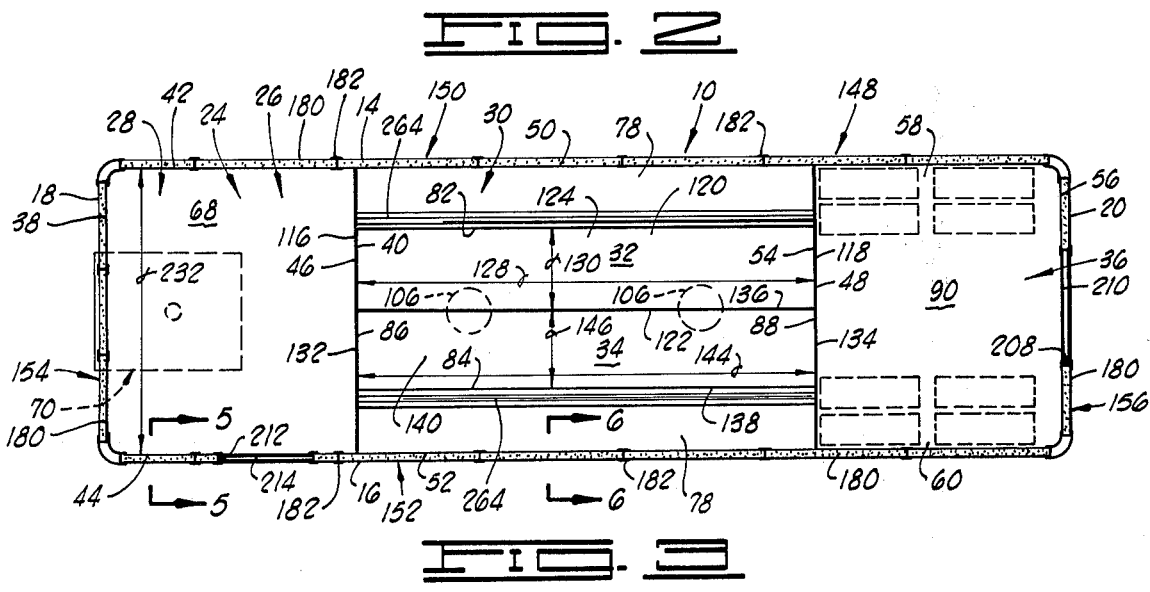
FIG. 3 is a top plan view of the floor assembly of the trailer of FIG. 1, similar to FIG. 2, but shown in the floor supported cargo hauling position.

As shown more clearly in FIGS. 2 and 3, the trailer frame 12 includes a floor assembly 24 positionable in a granular material hauling position and in a floor supported cargo hauling position, the trailer 10 being constructed to haul cargo of the type which is at least partially supported on the trailer floor assembly 24 such as cattle, for example, and to haul cargo of the type which is retained within a material bin space such as grain or sugar or the like, as mentioned before. The floor assembly 24 extends generally between the first and second sides 14 and 16 and between the forward and rearward ends 18 and 20 providing a substantially continuous unitary floor supporting structure 26 in a floor supported cargo hauling position, as shown in FIG. 3.

The floor assembly 24, more particularly, includes a forward floor section 28, a center floor section 30, a first floor panel 32, a second floor panel 34 and a rearward floor section 36. The forward floor section 28, more particularly, has a first end 38, a second end 40, a first side 42, and a second side 44, the first end 38 being connected to the forward end 18 of the trailer frame 12 and the forward floor section 28 extending a distance therefrom toward the rearward end 20 of the trailer frame 12, terminating with the second end 40. The forward floor section 28, further, extends between the first and second sides 14 and 16 of the trailer frame 12 having the first side 42 connected to the first side 14 of the trailer frame 12 and the second side 44 connected to the second side 16 of the trailer frame 12, the forward floor section 28 encompassing and covering a portion of the trailer frame opening 22. The center floor section 30 generally includes a first end 46, a second end 48, a first side 50 and a second side 52, the first end 46 of the center floor section 30 abutting and connected to the second end 40 of the forward floor section 28 and the center floor section 30 extending a distance therefrom toward the rearward end 20 of the trailer frame and terminating with the second end 48. The center floor section 30, further, extends between the first and second sides 14 and 16 of the trailer frame, having the first side 50 connected to the first side 14 of the trailer frame 12 and the second side 52 connected to the second side 16 of the trailer frame 12, the center floor section 30 cooperating with the first and second floor panels 32 and 34 to encompass and cover a portion of the trailer frame opening 22. The rearward floor section generally includes a first end 54, a second end 56, a first side 58 and a second side 60, the first end 54 of the rearward floor section 36 abutting and connected to the second end 48 of the center floor section 30 and the floor section 36 extending a distance therefrom toward the rearward end 20 of the trailer frame 12 terminating with the second end 56, the second end 56 being connected to the rearward end 20 of the trailer frame 12. The rearward floor section, further, extends between the first and second sides 14 and 16 of the trailer frame 12 having the first side 58 connected to the first side 14 of the trailer frame 12 and the second side 60 connected to the second side 16 of the trailer frame 12, the rearward floor section 36 encompassing and covering a portion of the trailer frame opening 22.

The forward floor section 28 and the rearward floor section 36 are constructed in a similar manner and each includes a plurality of spaced I-shaped support beams referred to herein as the I-beams 62, a channel beam 64 and a pair of end plates 66. The forward floor section 28 also includes a forward floor panel 68 and a turntable assembly 70 constructed to be removably connected to the tiltable fifth wheel assembly of the truck tractor. The I-beams 62 each extend between the first and second sides 42 and 44 of the forward floor section 28, one end of each of the I-beams 62 being connected to one of the end plates 66 and the opposite end of each of the I-beams 62 being connected to the other of the end plates 66. The I-beams 62 are spaced along the forward floor section 28 between the first and second ends 38 and 40 wherein one of the I-beams 62 forms the first end 38 of the forward floor section 28 and each I-beam 62 is disposed in a manner between the end plates 66 such that the rib portions of each of the I-beams 62 is disposed in a generally vertical plane. The channel beam 64 is positioned between and near one end of the end plates 66 and each end of the channel beam 64 is connected to one of the end plates 66, the channel beam 64 forming the second end 40 of the forward floor section 28; and, more particularly, the rib portion of the channel beam 64 is disposed vertically and forms the second end 40 wherein the upper and lower flanges of the channel beam 64 each extend toward the first end 38 of the forward floor section 28. Thus, as shown more clearly in FIGS. 2 and 5, the end plates 66 each cover one end of the I-beams 62 and one end of the channel beam 64, and the end plates 66 form the first and second sides 42 and 44 of the forward floor section 28, the ends of the end plates 66 each extending between the first and second ends 38 and 40 of the forward floor section 28.

The forward floor panel 68 of the forward floor section 28 is positioned upon and connected to the upper flanges of the I-beams 62 and the channel beam 64 and the forward floor panel 68 extends between the first and second ends 38 and 40 and the first and second sides 42 and 44 of the forward floor section 28, the forward floor panel 68 forming a portion of the floor supporting structure 26. The turntable assembly 70 is connected to the lower flanges of some of the I-beams 62 generally near the first end 38 of the forward floor section 28, the turntable assembly to being spaced between the first and second sides 42 and 44 for connecting the trailer 10 to the fifth wheel of the truck tractor.

The center floor section 30, as more clearly shown in FIGS. 2 and 6, includes a plurality of T-shaped support beams referred to herein as the T-beams 72 extending between the first and second sides 50 and 52. A plurality of C-shaped floor support members 74 (four floor support members 74 being shown in FIG. 2) extend between the first and second ends 46 and 48 and each of the floor support members 74 supported by the T-beams 72, the floor support members 74 being spaced apart in a manner forming an opening 76 through the center floor section 30. A pair of center floor panels 78 each extend between the first and second ends 46 and 48, and each of the center floor panels 78 are disposed and supported on the floor support beams 74. A plurality of substantially rectangularly shaped connecting plates 80 are each secured to and cover the ends of the T-beams 72. The T-beams 72 are spaced apart between the first and second ends 46 and 48 and the rib portion of each of the T-beams 72 is disposed in a substantially vertical plane with the flange portion of each of the T-beams 72 forming the support for the floor support members 74.

One of the floor support members 74 is positioned on the T-beams, generally adjacent the first side 50 of the center floor section 30, and one other of the floor support beams 74 is positioned on the T-beams 72, generally adjacent the first side 50. Similarly, a pair of the floor support members 74 is positioned on the T-beams 72, one adjacent the other, with one of the floor support beams 74, disposed, generally adjacent the second side 52 of the center floor section 30. Each of the floor support members 74 extends across the spaced T-beams 72, having one end forming the first end 46 of the center floor section 30 and the opposite end forming the second end 48 of the center floor section 30. Each floor support member 74 is disposed on the T-beams 72 having the flanges of the open side of each of the floor support members 74 (shown more clearly in FIG. 6) engaging and secured to the flange portion of the T-beams 72. The ends of the floor support members 74 form the first end 46 of the center floor section 30 abutting the second end 40 of the forward floor section 28 and, more particularly, abutting the rib portion of the channel beam 64. The ends of the floor support members 74 are connected to the rib portion of the channel beam 64, such as by welding, for example, and, the ends of the floor support members 74, forming the second end 48 of the center floor section 30, abut the first end 54 of the rearward floor section 38. Each pair of floor support members 74 are spaced apart as mentioned before, one pair of floor support members 74 being connected to a portion of the T-beams 72 generally near the first side 50 and one pair of the floor support members 74 being connected to a portion of the T-beams 72 generally near the second side 52 of the center floor section 30. The spaced apart relationship of the pairs of floor support members 74 forms a portion of the opening 76 through the center floor section 32 exposing a portion of the T-beams 72. A portion of the second end 40 of the forward floor section 28 and a poriton of the first end 54 of the rearward floor section 36 each form a portion of the opening 76.

One of the center floor panels 78 is disposed on the pair of floor support members 74 generally adjacent the first side 50 of the center floor section 30, and extends between the ends of the floor support members 74 and between the first side 50 and the opening 76 formed by the edge of one of the floor support members 74. The other of the center floor panels 78 is disposed on the pair of floor support members 74 generally adjacent the second side 52 of the center floor section 30, and extends between the ends of the floor support members 74 and between the second side 52 and the opening 76 formed by the edge of one of the floor support members 74. Each center floor panel 78 forms a portion of the floor supporting structure 26. The edge of one of the floor support members 74, generally adjacent the first side 50 of the center floor section 30, forms the side 82 of the opening 76 and the edge of one other of the floor support members 74 forms the side 84 of the opening 76, a portion of the second end 40 of the forward floor section 28 forms the side 86 of the opening 76 and a portion of the first end 54 of the rearward floor section 36 forms the side 88 of the opening 76.

As mentioned before, the rearward floor section 36 is constructed similar to the forward floor section 28 and includes a plurality of the spaced I-beams 62, a channel beam 64 and a pair of end plates 66. The rearward floor section 36 also includes a rearward floor panel 90. The I-beams 62 of the rearward floor section 36 each extend between the first and second sides 58 and 60 of the rearward floor section 36, one end of each of the I-beam 62 being connected to one of the end plates 66 and the opposite end of each of the I-beams 62 being connected to the other end plate 66. The I-beams 62 are spaced along the rearward floor section 36 between the first and second ends 54 and 56 such that one of the I-beams 62 forms the second end 56 of the rearward floor section 36. The I-beams 62 of the rearward floor section 36 are disposed and oriented in a manner between the end plates 66 such that the rib portion of each of the I-beams 62 is disposed in a generally vertical plane. The channel beam 64 of the rearward floor section 36 is positioned between and near one end of the end plates 66 and each end of the channel beam 64 is connected to one of the end plates 66, thereby forming the first end 54 of the rearward floor section 36; and more particularly, the rib portion of the channel beam 64 is disposed vertically and forms the first end 54 wherein the upper and lower flanges of the channel beam 64 extend toward the second end 56 of the forward floor section 28.

The second end 48 of the center floor section 30 abutts the first end 54 of the rearward floor section 36 and, more particularly, the ends of the floor support member 74 forming the second end 48 of the center floor section 30 abutt the rib portion of the channel beam 64 of the rearward floor section 36 and are connected thereto such as by welding, for example. A portion of the channel beam 64 of the rearward floor section 36 forms the side 88 of the opening 76 through the center floor section 30. Thus, as shown more clearly in FIGS. 2 and 5, the end plates 66 of the rearward floor section 36 cover each end of the I-beams 62 and the channel beam 64, and the end plate 66 form the first and second sides 58 and 60 of the rearward floor section 36, the ends of the end plates 66 extending between the first and second ends 54 and 56 of the rearward floor section 36.

The rearward floor panel 90 of the rearward floor section 36 is positioned on and connected to the upper flanges of the I-beams 62 and the channel beam 64. The rearward floor panel 90 extends between the first and second ends 54 and 56 and the first and second sides 58 and 60 of the rearward floor section 36, the rearward floor panel 90 forming a portion of the floor supporting structure 26.

The trailer 10 also includes a pair of frusto-conically shaped hoppers 100, having interconnected hopper sides 102 tapered inwardly from an open upper end 104 of the hoppers 100 toward an open lower end 106. The hopper sides 102, generally adjacent the open upper end 104 of the hopper 100, are each connected to the trailer frame 12, generally between the forward and rearward ends 18 and 20 and generally between the first and the second sides 14 and 16. The hopper sides 102 form hopper material bin spaces 108 for receiving and holding granular material and the like generally between the open upper end 104 and the open lower end 106.

In one preferred form, as shown more clearly in FIG. 2, one of the hopper sides 102 of each of the hoppers 100 is connected to the side 82 of the opening 76 through the center floor section 30 and one other of the hopper sides 102 of each of the hoppers is connected to the side 84 of the opening 76, the remaining two hopper sides 102 of each hopper 100 being secured to portions of one of the T-beams 72, the T-beam 72 being centrally located between the sides 86 and 88 of the opening 76. The open upper end 104 of each of the hoppers 100 are secured to the trailer frame 12 such that the hoppers 100 are disposed and extend generally below the trailer frame 12. In an assembled position of the hoppers 100, the open upper ends 104 of the hoppers 100 are thus disposed generally adjacent and in communication with a portion of the trailer frame opening 22 via the opening 76, the open upper ends 104 and the portion of the trailer frame opening 22 in communication therewith via the opening 76. The opening 76 forms what is sometimes referred to herein as a "hopper inlet opening 76" for receiving granular material and the like therethrough to be disposed within the hopper material bin space 108 during one aspect of the operation of the trailer 10.

A hopper door 110 is movably connected to the hopper sides 102 of each of the hoppers 100, generally near the open lower ends 106 thereof, the hopper doors 110 being positionable in an opened and a closed position. In the open position of the hopper doors 110, the open lower ends 106 are substantially opened allowing the granular material or the like stored and disposed within the hopper material bin space 108 to be discharged therethrough. In the closed position of the hopper doors 110, the hopper doors 110 substantially cover the open lower ends 106 preventing the release of and retaining the granular material or the like stored within the hopper material bin space 108.

Various forms of hoppers connectable to frames of trailer bodies and constructed for retaining or storing a predetermined volume of granular material within a hopper material bin space having a hopper door positionable to opened and closed positions in a manner described before with respect to the hoppers 100 and the hopper doors 110 are well known in the art. Since various embodiments of conventional hoppers and hopper doors can be utilized and incorporated in combination with the trailer of the present invention, further detailed discussion with respect to the construction and the operation of the hoppers 100 and hopper doors 110 is not deemed necessary.

In the floor supported cargo hauling position of the trailer 10, the first and second floor panels 32 and 34 are positioned within and cover the hopper inlet opening 76 and form a portion of the floor supporting structure 26. The hopper inlet opening 76 formed in the center floor section 30 for providing communication of the trailer frame opening 22 with the hopper material bin spaces 108 of the hoppers 100, has a length 112 and a width 114.

The first floor panel 32, as shown in FIG. 3, has opposite ends 116 and 118, opposite sides 120 and 122, and an upper and lower face 124 and 126. The length 128 between the opposite ends 116 and 118 of the first floor panel 32 is substantially equal to the length 112 of the hopper inlet opening 76 and the width 130 between the opposite sides 120 and 122 of the first floor panel 32 is substantially equal to one-half the width 114 of the hopper inlet opening 76. The first floor panel 32 is removably supported within the hopper inlet opening 76 via the supporting engagement of the first floor panel 32 and the T-beams 72 of the center floor section 30. The end 116 of the first floor panel 30 is disposed adjacent the side 36 of the opening 76 in the floor supported cargo hauling position, the end 118 being positioned adjacent a portion of the side 88 of the opening 76 and the side 120 being positioned adjacent the side 82 of the opening 76. The first floor panel 32 substantially covers one-half of the hopper inlet opening 76 with the lower face 126 supportingly engaging the T-beams 72 and the upper face 124 of the first floor panels 32 forming a portion of the floor support structure 26 for receiving and supporting cargo to be transported via the trailer 10.

The second floor panel 34, as shown in FIG. 3, has opposite ends 132 and 134, opposite sides 136 and 138, and an upper and a lower face 140 and 142. The length 144 between the opposite ends 132 and 134 of the second floor panel 34 is substantially equal to the length 112 of the hopper inlet opening 76 and the width 146 between the opposite sides 136 and 138 of the second floor panel 34 is substantially equal to one-half the width 114 of the hopper inlet opening 76. The second floor panel 34 is removably supported within the hopper inlet opening 76 via the supporting engagement of the second floor panel 34 and the T-beams 72 of the center floor section 30 in the floor supported cargo hauling position of the trailer 10. The side 136 of the second floor panel 34 is positioned adjacent the side 122 of the first floor panel 32 with the ends 132 and 134 of the second floor panel 34 positioned adjacent a portion of the sides 86 and 88, respectively, of the opening 76 and the side 138 of the second floor panel 34 adjacent the side 84 of the opening 76. The second floor panel 34 substantially covers one-half of the hopper inlet opening 76 with the lower face 142 supportingly engaging the T-beams 72 and the upper face 140 of the second floor panel 34 forming a portion of the floor support structure 26 for receiving and supporting cargo to be transported via the trailer 10. Thus, the first and second floor panels 32 and 34 cooperate to encompass the hopper inlet opening 76 for enclosing the trailer frame opening 22 in the floor supported cargo hauling position of the trailer 10, the first and second floor panels 32 and 34 cooperating with the forward floor panel 68 of the forward floor section 28, the center floor panels 78 of the center floor section 30 and the rearward floor panel 90 of the rearward floor section 36 to form the floor support structure 26.

The trailer 10 includes a trailer wall assembly 148 comprising a first side wall 150, a second side wall 152, a forward end wall 154 and a rearward end wall 156.

The first side wall 150 has a lower end 158 connected to the trailer frame 12, generally near the first side 14 thereof, and extends a predetermined distance generally perpendicularly upwardly therefrom terminating with an upper end 160. A lower end 162 of the second side wall 152 is connected to the trailer frame 12, generally near the second side 16 thereof, the second side wall 152 extending a distance generally perpendicularly upwardly from the trailer frame 12 terminating with an upper end 164. A lower end 166 of the forward end wall 154 is connected to the trailer frame 12, generally near the forward end 18 thereof, the forward end wall 154 extending a distance generally perpendicularly upwardly from the trailer frame 12 terminating with an upper end 168. A lower end 170 of the rearward end wall 156 is connected to the trailer frame 12, generally near the rearward end 20 thereof, the rearward end wall 156 extending a distance generally perpendicularly upwardly from the trailer frame 12 terminating with an upper end 172. The upper ends 160, 164, 168, and 172 of the first and the second side walls 150 and 152 and the forward and rearward end walls 154 and 156 are each disposed in a substantially coplanar horizontal relationship cooperatingly forming what is sometimes referred to herein as an upper end 174 of the trailer wall assembly 148.

The first and second side walls 150 and 152 and the forward and rearward end walls 154 and 156 each include an upper extrusion 176, a lower extrusion 178, a plurality of wall panels 180 and a plurality of H-shaped retaining members 182. The lower extention 178, as shown more clearly in FIGS. 5 and 6, is spaced from the upper extrusion 176 by the wall panels 180. The wall panels 180 each have an upper end 184, a lower end 186, and opposite sides 188 and 190 as shown in FIGS. 5–8. Each wall panel 180 is constructed of a core member 191 secured between a pair of spaced panels 193 and 195, one side of the core member 191 being secured to one face of the panel 193 and the opposite side of the core member 191 being secured to one face of the panel 195. The panels 193 and 195 and the core member 191 of the wall panels 180 each extend between the upper and lower ends 184 and 186 and between the opposite sides 188 and 190. The lamination of the panels 193 and 195 to the core member 191 enhance the structural integrity of the wall panels 180. In one preferred embodiment, the core members 191 are constructed paper material formed in a honeycomb like structure, such core member 191 materials being commercially available.

The upper end 184 of each wall panel 180 is disposed with and retained by an L-shaped retaining flange 192 formed on the upper extrusion 176, and the lower end 186 of the wall panel 180 is disposed within and retained by an L-shaped supporting flange 194 formed on the lower extrusion 178 for supporting the wall panels 180. Each side 188 and 190 of the wall panels 180 are retainingly encompassed within a portion the retaining members 182, the retaining members 182 being spaced along the upper and lower extrusions 176 and 178 and disposed generally vertically therebetween having one end connected to the upper extrusion 176 and the opposite end connected to the lower extrusion 178.

Each wall panel 180 is further retained in place and structurally supported by securing the upper and lower ends 184 and 186 and the opposite sides 188 and 190 to the retaining flange 192 of the upper extrusion 176, the supporting flange 194 of the lower extrusion 178 and the retaining members 182 such as by riveting or by bonding with an adhesive, for example, to augment the structural integrity provided the wall panel 180 by the upper and lower extrusions 176 and 178 and the retaining members 182.

The lower extrusion 178 forms the lower ends 158, 162, 166 and 170 of the first and second side walls 150 and 152 and the forward and rearward end walls 154 and 156, respectively. The lower extrusion 178 of the first and second side walls 150 and 152 and the forward and rearward end walls 154 and 156, are secured to the floor assembly 24 and, more particularly the first and second side walls 150 and 152 comprise the primary structural support for the connection between the forward floor section 28, the center floor section 30, and the rearward floor section 36.

The second side wall 152 is connected to the forward and center floor sections 28 and 30 via an L-shaped floor connecting extension 196 and a floor support flange 198 both being formed on the lower extrusion 178, the floor connecting extension 196 extending below the lower end 162 of the second side wall 152 to engage a portion of the floor assembly 24. It should be noted that the connection of the second side wall 152 to the rearward floor section 36 is similar to the connection of the second side wall 152 to the forward floor section 28 as shown in FIG. 5 and that the first side wall 150 is connected to the forward, the rearward and the center floor section 28, 30, and 36 in a manner similar to that shown in FIGS. 5 and 6. The second side wall 152 is positioned on the floor assembly 24 with the floor connecting extension 196 disposed generally adjacent the second sides 44, 52 and 60 of the forward, center and rearward floor sections 28, 30 and 36 with the floor supporting flange 198 of the lower extrusion 178 supportingly engaging the forward, center and rearward floor panels 68, 78, and 90 near the second sides 44, 52 and 60 of the forward, center and rearward floor sections 28, 30 and 36. The floor connecting extension 196 is secured along the side of the floor assembly 24 via bolt fasteners 200, or the like, spaced along the length of the lower extrusion 178. The bolt fasteners 200 extend through the floor connecting extension 196 and the end plates 66 of the forward and rearward floor sections 28 and 36, as shown in FIG. 5, and through each connecting plate 80 of the center floor section 30, as shown in FIG. 6. A floor support flange 198 formed on the lower extrusion 178 is secured to the forward, center and rearward floor panels 68, 78, and 90 via a substantially continuous weld or the like along the length of the floor support flange 198, in one preferred form.

The forward and rearward end walls 154 and 156 are secured to the first end 40 of the forward floor section 28 and the second end 56 of the rearward floor section 36, respectively in a manner similar to connection of the first and second side walls 150 and 152 to the forward, center and rearward floor sections 28, 30 and 36.

A corner support member 202 is disposed at each corner of the trailer frame 12, one end of each of the corner support members 202 being secured to the floor assembly 24 and each of the corner support members 202 extending generally vertically upwardly from the floor assembly 24. More particularly, one of the corner support members 202 is disposed between and connects one end of the first side wall 150 to one end of the forward end wall 154; one of the corner support members 202 is disposed between and connects one end of the second side wall 152 to one end of the rearward end wall 156; and one of the corner support members 202 is disposed between and connects one end of the second side wall 152 to one end of the forward end wall 154.

The corner support member 202 has retaining flange 204 formed on each side, as more clearly shown in FIG. 7, to retainingly encompass and support the sides 190 or 188 of the wall panels 180 that form a portion of each end of the first and second side walls 150 and 152 and the forward and rearward end walls 154 and 156 in a manner similar to the retaining members 182 described before.

Figure 10:
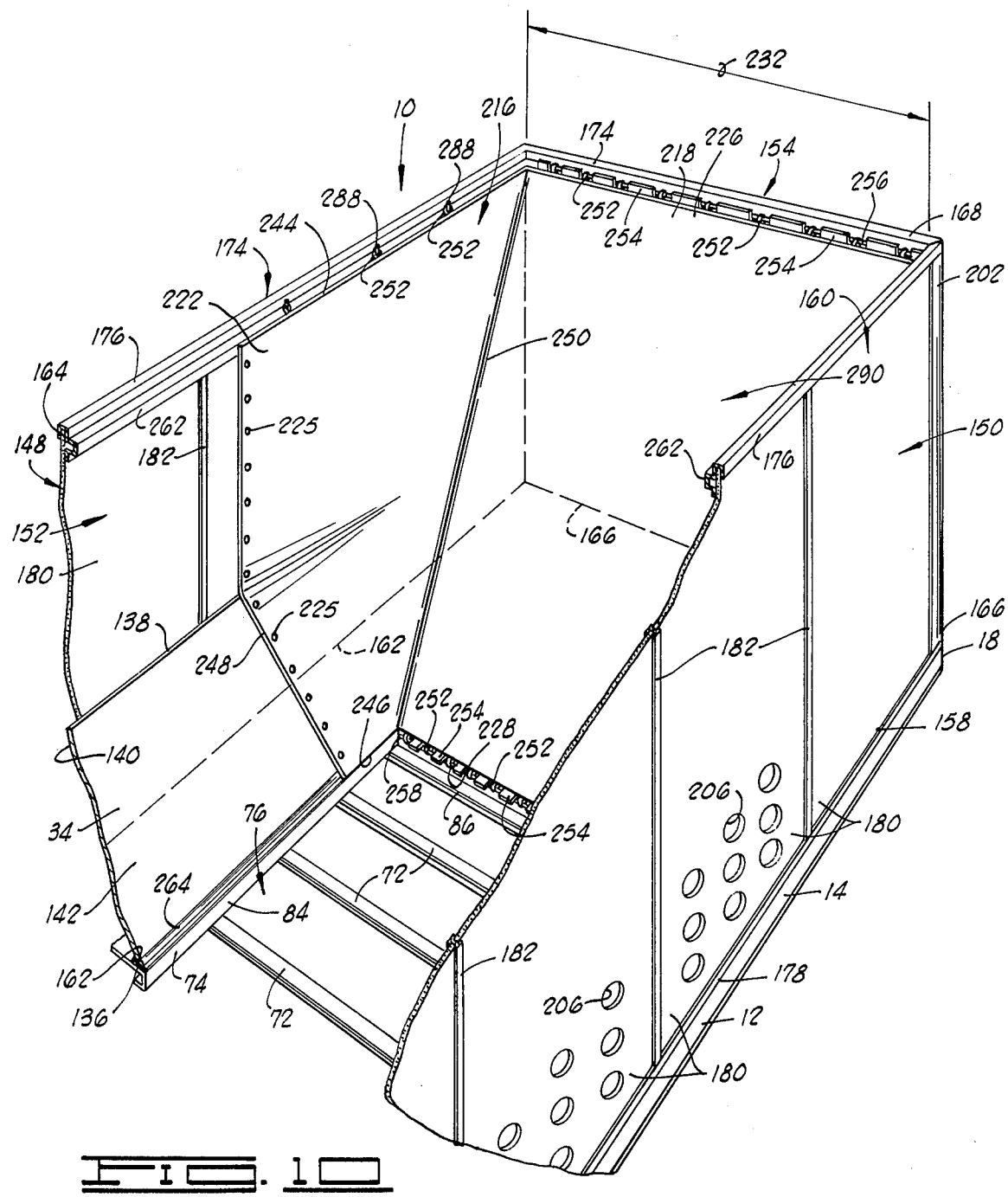
FIG. 10 is a fragmentary, diagrammatical view of a portion of the trailer of FIG. 1 with the end slope member of FIG. 9 connected thereto in the granular hauling postion.

A portion of the wall panels 180 of the first and second side walls 150 and 152 are provided with a plurality of ventilation opening 206, as more clearly shown in FIGS. 1 and 10. The ventilation openings 206 are formed through the wall panels 180 near the lower end 186, the ventilation openings 206 being spaced apart vertically and spaced between the sides 188 and 190. The ventilation openings 206 facilitate the circulation of air through the portion of the trailer providing ventilation for floor supported cargo, such as cattle, for example.

As shown more clearly in FIG. 3 a rear door opening 208 is formed through a portion of the rearward end wall 156 and a rear door 210 is supported within the rear door opening 208 (the rear door 210 being shown in a closed position in FIG. 3). As shown more clearly in FIG. 1, a side door opening 212 is formed through a portion of the second side wall 152, generally near the forward end 18 of the trailer frame 12 and a side door 214 is disposed within the side door opening 212, the side door 214 being positionable in opened and closed positions (side door 214 being shown in FIG. 1 in a closed position). The rear door 210 and the side door 214 are each positionable in opened and closed positions and each cooperate to facilitate the loading and unloading of the trailer 10 from the forward and rearward ends 18 and 20 thereof during one aspect of the operation of the trailer 10.

The trailer 10 includes a pair of end slope members 216 constructed of a flexible material and shaped such that one end slope member 216 is fitted within the trailer frame opening 22 near the forward end 18 of the trailer frame 12 and the other of the end slope members 216 is fitted within the trailer frame opening 22 near the rearward end 20 of the trailer frame 12, the end slope members 216 cooperating with the first and second floor panels 32 and 34 and a portion of the first and second side walls 150 and 152 to form a material bin space in the granular material hauling position.

The end slope members 216 are each formed and constructed, as shown in FIG. 9, and each end slope member 216 has a center section 218, a first side flap 220, a second side flap 222, a plurality of support straps 224 and a plurality of snap-fasteners 225. The center section 218 and the first and second side flaps 220 and 222 are formed integrally from a flexible material such as a neoprene coated fabric or the like, for example (the first and second flaps 220 and 220 and the center section 218 being shown lying substantially in the same plane, i.e., lying flat in FIG. 9). The center section 218 has upper and lower ends 226 and 228 extending between the first and second side flaps 220 and 222. The upper end 226 of the center section 218 has a width 230 generally equal to the width 232 between the first and second side walls 150 and 152 defined by the forward and rearward end walls 154 and 156 and the lower end 228 of the center section 218 has a width 234 generally equal to the width 114 of the hopper inlet opening 76, for reasons to be described in greater detail below.

The first side flap 220 has upper and lower ends 236 and 238 and an edge 240 extending between the upper and lower ends 236 and 238 having a generally perpendicular disposition with respect to the upper and lower ends 236 and 238. The upper end 236 of the first side flap 220 extends angularly from the upper end 226 of the center section 218 in a direction generally from the upper end 226 toward the lower end 228 of the center section 218 terminating at the edge 240 of the first side flap 220. The lower end 238 extends angularly from the lower end 228 of the center section 218 generally in a direction from the upper end 226 toward the lower end 228 of the center section 218 and terminating with the edge 240 of the first side flap 220, the lower end 238 extending from the lower end 228 of the center section 218 and having a generally parallel disposition with respect to the upper end 236 of the first side flap 220. The first side flap 220 tapers from the upper end 236 toward the lower end 238 generally along a fold line 242 (the fold line 242 being shown in FIG. 9 by a dashed-line extending from the intersection of the upper ends 226 and 236 to the intersection of the lower ends 228 and 238 of the center section 218 and the first side flap 220), for reasons which will be made more apparent below.

The second side flap 222 has upper and lower ends 244 and 246 and an edge 248 extending between the upper and lower ends 244 and 246 having a generally perpendicular disposition with respect to the upper and lower ends 244 and 246. The upper end 244 of the second side flap 222 extends angularly from the upper end 226 of the center section 218 in a direction generally from the upper end 226 toward the lower end 228 of the center section 218 terminating at the edge 248 of the second side flap 222. The lower end 246 extends angularly from the lower end 228 of the center section 218 generally in a direction from the upper end 226 toward the lower end 228 of the center section 218 terminating with the edge 248 of the second side flap 222, the lower end 246 extending from the lower end 228 of the center section 218 and having a generally parallel disposition with respect to the upper end 244 of the second side flap 222. The second side flap 222 tapers from the upper end 244 toward the lower end 246 generally along a fold line 250 (the fold line 250 being shown in FIG. 9 by a dashed-line extending from the intersection of the upper ends 226 and 244 to the intersection of the lower ends 228 and 246 of the center section 218 and the second side flap 222, for reasons which will be made more apparent below.

The support straps 224 are secured to the back face of the end slope member 216, as shown in FIG. 9. The center section 218 has a portion of the support straps 224 extending between the upper and lower ends 226 and 228 and spaced apart between the fold lines 242 and 250, the support straps 224 having a converging relationship generally from the upper end 226 of the center section 218 toward the lower end 228. The support straps 224 have fastening loops 252 formed on each end, some of the support straps 224 extending beyond the upper end 226 of the center section 218 and some of the support straps 224 extending beyond the lower end 228 of the center section 218 on the other end.

Some of the support straps 224 are secured to the back face of the first side flap 220 (three support straps 224 being shown secured to the first side flap 220 in FIG. 9). The support straps 224 each extend in a direction generally from the upper end 236 foward the lower end 238. One support strap 224 extends a distance from the upper end 236, near the edge 240 of the first side flap 220, terminating at the intersection of the lower ends 228 and 238 of the center section 218 and the first side flap 220 respectively. Another support strap 224 extends a distance from the upper end 236 of the first side flap 220 terminating with a centrally located support strap 224 on the center section 218 at the lower end 228, the support strap 224 crossing a portion of the support straps 224 on the center section 218. Another support strap 224 extends a distance from the upper end 236, near the intersection of the upper ends 226 and 236 of the center section 218 and the first side flap 220, crossing the support straps 224 of the center section 218 and terminating at the intersection of the lower ends 228 and 246 of the center section 218 and the second side flap 222. Fastening loops 252 are formed on one end of the support straps 224 of the first side flap 220 and extend beyond the upper end 236 of the first side flap 220.

Some of the support straps 224 are secured to the back face of the second side flap 222 (three support straps 224 being shown secured to the second side flap 222 in FIG. 9) extending in a direction generally from the upper end 244 toward the lower end 246. One support strap 224 extends a distance from the upper end 244, near the edge 248 of the second side flap 222, terminating at the intersection of the lower ends 228 and 246 of the center section 218 and the second side flap 222 respectively. Another support strap 224 extends a distance from the upper end 244 of the second side flap 222 terminating with a centrally located support strap 224 on the center section 218 at the lower end 228, the support strap 224 crossing a portion of the support straps 224 on the center section 218. Another support strap 224 extends a distance from the upper end 244, near the intersection of the upper ends 226 and 244 of the center section 218 and the second side flap 222, crossing the support straps 224 of the center section 218 and terminating at the intersection of the lower ends 228 and 228 of the center section 218 and the first side flap 220. Fastening loops 252 are formed on one end of the support straps 224 of the second side flap 222 and extend beyond the upper end 244 of the second side flap 222.

A plurality of the snap fasteners 225 are secured to the first side flap 220 near the edge 240, the snap fasteners 225 being spaced along the edge 240. A plurality of the snap fasteners 225 are secured to the second side flap 222 near the edge 248, the snap fasteners 225 being spaced along the edge 248. The snap fasteners 225 and the fastening loops 252 are utilized to secure each of the end slope members 218 to the trailer frame 12 for supporting the end slope members 218 in a position to form the granular material bin space.

The end slope members 216 are shaped to enable the end slope members 218 to be fitted within the trailer frame opening 22 with the upper ends 226, 236, and 244 of the center section 218 and the first and second side flaps 220 and 222, respectively conforming with a portion of the upper end 174 of the trailer wall assembly 148 and the lower ends 228, 238, and 246 of the center section 218 and the first and second side flaps 220 and 222, respectively, conforming with a portion of the hopper inlet opening 76.

As shown in FIG. 10, one end slope member 216 is secured to the trailer frame 12 within the trailer frame opening 22 near the forward end 18. The other end slope member 216 is secured to the trailer frame 12 within the trailer frame opening 22 near the rearward end 20 in a manner like that shown in FIG. 10, the connection of only one end slope member 216 to the trailer frame 12 being shown in FIG. 10 for clarity of description. The upper end 226 of the center section 218 is fastened to the upper end 168 of the forward end wall 154 and the lower end 228 of the center section 218 is fastened to the side 86 of the hopper inlet opening 76, the center section 218 sloping downwardly from the upper end 168 of the forward end wall 154 to the hopper inlet opening 76 formed through the floor assembly 24. The first side flap 220 is fastened to the upper end 158 of the first side wall 150 (not shown in FIG. 10 near the forward end 18 with the edge 240 fastened along the first side wall 150 generally vertically from the upper end 160 toward the lower end 158 with the lower end 248 disposed generally adjacent a portion of the side 82 of the hopper inlet opening 76 (not shown in FIG. 10) near the side 86, the first side flap 220 being folded along the fold line 242 to conform to a portion of the first side wall 150. The second side flap 222 is fastened to the upper end 164 of the second side wall 152 near the forward end 18 with the edge 248 fastened along the second side wall 152 generally vertically from the upper end 164 toward the lower end 162 with the lower end 246 of the second side flap 222 disposed generally adjacent a portion of the side 84 of the hopper inlet opening 76 near the side 86, the second side flap 222 being folded along the fold line 250 to generally conform to a portion of the second side wall 152.

The structure for fastening the end slope members 216 to the trailer frame 12 includes a plurality of L-shaped retaining brackets 254, a pair of upper fastening rods 256, a pair of lower fastening rods 258, and a plurality of snap fasteners 260, each one of the snap fasteners 260 being constructed to mate with and retain a portion of one of the snap fasteners 225. It should be noted that the snap fasteners 225 and 260 are commercially available forms of fasteners.

As shown in FIGS. 5, 6, and 10, some of the retaining brackets 254 are spaced along and secured to the upper extrusions 176 of the forward and rearward end walls 154 and 156. More particularly, one leg of the retaining brackets 254 is supported on and secured to a cross-sectionally square shaped shoulder 262 formed as part of the upper extrusion 176 disposed within and extending about the trailer frame opening 22.

The retaining brackets 254 connected to the shoulders 262 of the upper extrusions 176 of the forward and rearward end walls 154 and 156, are spaced a distance apart and have a sufficient length such that the fastening loops 252 of the center sections 218 of the end slope members 216 are disposed between the upwardly projecting legs of the retaining brackets 254. In this position of the fastening loops 252, the upper fastening rods 256 extended through the fastening loops 252 of the end slope member 216. The upper fastening rods 256 are fitted in the forward end 18 of the trailer frame 12 and positioned within the trough formed by the upwardly projecting leg of the retaining brackets 254 and a portion of the retaining flange 192 of the upper extrusion 176, thereby fastening or securing the upper end 226 of the center section 218 to the upper end 168 of the forward end wall 154, as shown more clearly in FIG. 10. The other of the upper fastening rods 256 is extended through the fastening loops 252 of the end slope member 216 fitted in the rearward end 20 of the trailer frame 12 and positioned within the trough formed by the upwardly extending legs of the retaining brackets 254 and a portion of the retaining flange 192 of the upper extrusion 176, thereby fastening or securing the upper end 226 of the center section 218 to the upper end 172 of the rearward end wall 154.

The retaining brackets 254 are positioned on the shoulder 262 such that the leg secured to the shoulder 262 extends from the retaining flange 192 of the upper extrusion 176 toward the trailer frame opening 22 intersecting the other leg of the retaining brackets 254, the other leg projecting upwardly from the shoulder 262 of the upper extrusion 176. The other portion of the retaining brackets 254 are spaced along and secured to each side 86 and 88 of the hopper inlet opening 76 such that the retaining brackets 254 secured to the side 86 have a leg extending outwardly from the side 86 toward the side 88 of the hopper inlet opening 76, the leg being disposed generally coplanar with the floor support structure 26. The retaining brackets 254 secured to the side 88 have one of the legs extending outwardly from the side 88 toward the side 86 of the hopper inlet opening 76, the leg being disposed generally coplanar with the floor support structure 26.

The retaining brackets 254 secured to each side 86 and 88 of the hopper inlet opening 76 are spaced apart and have a length such that the fastening loops 252 disposed between the retaining brackets 254 secured to the side 86 of the hopper inlet opening 76 and is positioned below the outwardly extending legs of the retaining brackets 254, thereby fastening the lower end 228 of the center section 218 to the side 86 of the hopper inlet opening 76, as shown more clearly in FIG. 10. Similarly, the other of the lower fastening rods 258 is extended through the fastening loops 252 disposed between the retaining brackets 254 secured to the side 88 of the hopper inlet opening 76 and is positioned below the outwardly extending legs of the retaining brackets 254, thereby fastening the lower end 228 of the center section 218 to the side 88 of the hopper inlet opening 76 (not shown in FIG. 10).

Figure 11:
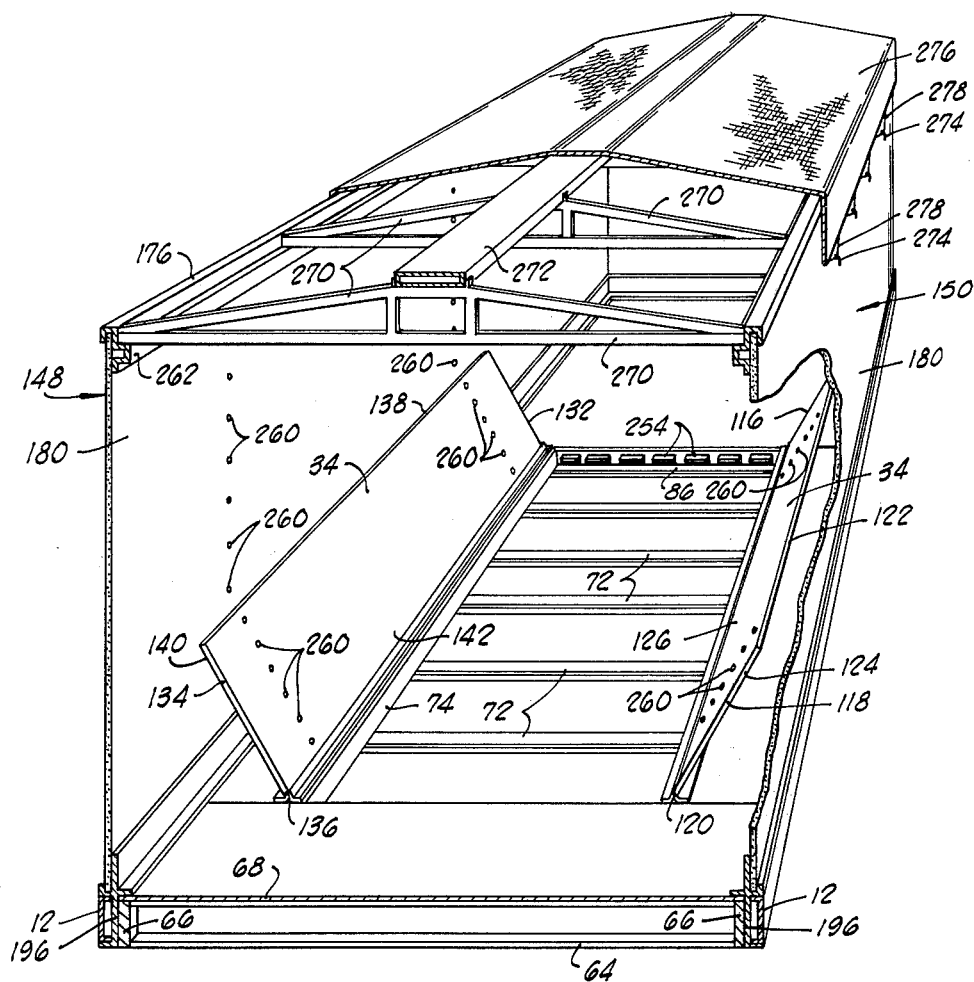
FIG. 11 is a fragmentary, diagrammatical view of a portion of the trailer of FIG. 1, showing the cover assembled and connected to the trailer.

As shown in FIGS. 3 and 10, a floor panel stop bar 264 is secured to the center floor panel 78 generally adjacent the first side 50 of the center floor section 20, the stop bar 264 being disposed generally adjacent the side 82 of the hopper inlet opening 76 and extending between the first and second ends 46 and 48 of the center floor section 30. Another stop bar 264 is secured to the other center floor panel 78 generally adjacent the second side 52 of the center floor section 30, the stop bar 264 being disposed generally adjacent the side 84 of the opening 76 and extending between the first and second ends 46 and 48 of the center floor section 30. As shown in FIG. 11, the trailer 10 also includes a plurality of generally triangularly shaped cover support structures 270. One end of each of the cover support structures 270 is connected to the upper end 160 of the first side wall 150 and the opposite end of each of the cover support structures 270 is connected to the upper end 164 of the second side wall 152, each cover support structure 270 extending between the first and the second side walls 150 and 152 and the cover support structures 270 being spaced generally between the forward end wall 154 and the rearward end wall 156. A beam 272 extends generally between the forward and the rearward end walls 154 and 156 and the beam 272 is disposed on a central portion of the cover support structures 270, portions of the beam 272 being connected to each of the cover support structures 270. The cover support structures 270 each extend a distance generally above the upper ends 160 and 164 of the first and the second side walls 150 and 152, and the cover support structures 270 cooperate to support the beam 272 in a position generally centrally disposed between the first and the second side walls 150 and 152. It should be noted that the cover support structures 270 and the beam 272 are shown only in FIG. 11 of the drawings and the cover support structures 270 and beam 272 have been omitted from the other Figures of the drawings for the purpose of clarity.

A plurality of hooks 274 are connected to and spaced along the first and the second side walls 150 and 152 and the forward and the rearward end walls 154 and 156 generally near the upper ends 160, 164, 168, and 172, respectively, as shown in FIG. 11 (only a portion of the hooks 274 connected to the first side wall 150 are shown in FIG. 11 for clarity).

The trailer 10 also includes a tarpaulin type of roof cover 276 having a plurality of fastening loops 278 secured thereto and spaced along the sides and the ends thereof (only some of the fastening loops 278 being shown in FIG. 11 for clarity). The roof cover 275 is sized and shaped to extend over and between the upper ends 160, 164, 168, and 172 of the first and the second side walls 150 and 152 and the forward and the rearward end walls 154 and 156, respectively. The fastening loops 278 are disposed on the roof cover 276 to be removably secured about the hooks 274. In an assembled position of the roof cover 276, the roof cover 276 is disposed generally over and supported by the cover support structures 270 and the beam 272, and the fastening loops 278 are each secured to one of the hooks 274 thereby securing the roof cover 276 in the assembled position substantially covering the opening defined via the upper end 174 of the trailer wall assembly 148.

A first step rail 280 is connected to the rearward end 20 of the trailer frame 12 and a second step rail 282 is connected to the rearward end wall 156, the second step rail 282 being disposed a distance generally above the first step rail 280. In a preferred embodiment, the substantially non-skid material is secured to the first and the second step rails 280 and 282 to substantially reduce the possibility of any individual slipping from the step rails 280 and 282.

A rear wheel assembly 284 is connected to the rearward floor section 36 of the trailer 10. When the turntable assembly 70 is connected to the fifth wheel assembly of the trucktractor, the rear wheel assembly 284 cooperates to rolling support the trailer 10 in the conventional manner.

In one preferred embodiment, the present invention contemplates the use of the trailer 10 and the additional or second trailer 10a, as shown in FIG. 4. The trailer 10a is constructed exactly like the trailer 10 described in detail before, except the trailer 10a does not include the turntable assembly, rather the modified trailer 10a includes a front wheel assembly 286 which is connected to the forward floor section 28 and cooperates with the rear wheel assembly 284 to rolling support the trailer 10a. In this embodiment of the invention, a tongue 287 is pivotally connected to the rearward floor section 36 of the trailer 10 and the tongue 288 extends a distance rearwardly from the trailer 10. The end of the tongue 288, opposite the end connected to the trailer 10, is removably connectable to a portion of the forward floor section 28 in a conventional manner so the self-supported trailer 10a can be towed in tandum by the trailer 10, as indicated in FIG. 4.

It should be noted that some of the snap fasteners 260 are connected the first and the second side walls 150 and 152 and some of the snap fasteners 260 are connected to the first and the second floor panels 32 and 34, as shown in FIG. 11. The snap fasteners 260 are constructed to be removably connected to the snap fasteners 225 on the end slope members 216 in a conventional manner.

In the floor supported cargo hauling position, the first and the second floor panels 32 and 34 are each disposed over the opening 76 in the center floor section 30. The first and the second floor panels 32 and 34 are each disposed on and supported by portions of the I-beams 72 of the center floor section 30, and the floor panels 32 and 34 cooperate to substantially encompass the opening 76, the floor panels 32 and 34 cooperating with the forward floor panel 68, the center floor panels 78 and the rearward floor panel 98 to provide a substantially continuous floor supporting structure 26. In this position, the end slope members 216 are each removed from the trailer 10 and stored for future use, and the roof cover 276 may be connected in an assembled position covering a substantial portion of the opening defined via the upper end 174 of the trailer wall assembly 148.

In the granular material hauling position, the first and the second floor panels 32 and 34 are removed from the opening 76, thereby providing communication with the interior of the trailer 10 and the hopper material bin space 108 via the opening 76. The first floor panel 32 is disposed generally near the first side wall 150 with the side 122 disposed generally adjacent the first side wall 150 and the side 120 disposed generally adjacent and engaging one of the stop bars 264, the first floor panel 32 being generally angularly disposed with respect to the first side wall 150 and retained in position via the engagement between the first floor panel 32 and the first side wall 150 and the engagement between the first floor panel 32 and the stop bar 264. The second floor panel 34 is disposed generally near the second side wall 152 with the side 138 disposed generally adjacent the second side wall 152 and the side 136 disposed generally adjacent and engaging one of the stop bars 264, the second floor panel 34 being generally angularly disposed with respect to the second side wall 152 and retained in position via the engagement between second floor panel 34 and the second side wall 152 and the engagement between the second floor panel 34 and the stop bar 264.

In the granular material hauling position of the first and the second floor panels 32 and 34, the first floor panel 32 extends along the side 82 of the opening 76, between the sides 86 and 88, the first floor panel 32 extending a distance angularly from the side 82 of the opening 76 to a position wherein the first floor panel 32 engages the first side wall 150. The first floor panel 32 thus forms an angularly extending wall in the trailer 10 for cooperating to retain the granular material and for cooperating to guide the granular material toward the hopper material bin space 108. In this position, the second floor panel 34 extends along the side 84 of the opening 76, between the sides 86 and 88, the second floor panel 34 extending a distance angularly from the side 84 of the opening 76 to a position wherein the second floor panel 34 engages the second wall 152. The second floor panel 34 thus forms an angularly extending wall in the trailer 10 for cooperating to retain the granular material and for cooperating to guide the granular material toward the hopper material bin space 108.

The end slope members 216 are installed in the trailer 10. The upper end 226 of the center section 218 of one of the end slope members 216 is connected to the upper end 168 of the forward end wall 154 via one of the upper fastening rods 256 extending through the fastening loops 252 and retained via the retaining brackets 254, and the lower end 228 of the center section 218 is connected to the floor supporting structure 26 generally adjacent the side 86 of the opening 76 via one of the lower fastening rods 258 extending through the fastening loops 252 and retained via the retaining brackets 254, the lower end 228 of the one center section 218 extending generally along the side 86 of the opening 76 between the sides 82 and 84. The edge 240 of the first side flap 220 is connected to the first side wall 150 and the first floor panel 32 via the snap fasteners 225 and 260, and the edge 248 of the second side flap 222 is connected to the second side wall 152 and the second floor panel 34 via the snap fasteners 225 and 260. The fastening loops 252 spaced along the upper end 236 of the first side flap 220 are each connected to one of a plurality of hooks 288 connected to upper end 160 of the first side wall 150, and the fastening loops 252 spaced along the upper end 244 of the second side flap 222 are each connected to one of a plurality of hooks 288 connected to the upper end 164 of the second side wall 152.

The other end slope member 216 is installed in a similar manner at the rearward end 20 of the trailer 10. The upper end 226 of the center section 218 of the other end slope member 216 is connected to the upper end 172 of the rearward end wall 156 via one of the upper fastening rods 256 extending through the fastening loops 252 and retained via the retaining brackets 254, and the lower end 228 of the center section 218 is connected to the floor supporting structure 26 generally adjacent the side 88 of the opening 76 via one of the lower fastening rods 258 extending through the fastening loops 252 and retained via the retaining brackets 254, the lower end 228 of the other center section 218 extending generally along the side 88 of the opening 76 between the sides 82 and 84. No edge 240 of the first side flap 220 is connected to the first wall panel 150 and the second floor panel 34 via the snap fasteners 225 and 260, and the edge 248 of the second side flap 222 is connected to the second side wall 152 and the second floor panel 34 via the snap fasteners 225 and 260. The fastening loops 252 spaced along the upper end 236 of the first side flap 220 are each connected to one of a plurality of hooks 288 connected to upper end 160 of the first side wall 150, and the fastening loops 252 spaced along the upper end 244 of the second side flap 222 are each connected to one of a plurality of hooks 288 connected to the upper end 164 of the second side wall 152.

Thus, in the granular material hauling position, one of the end slope members 216 forms a wall extending angularly from the upper end 168 of the forward end wall 154 downwardly to the side 88 of the opening 76 and the other end slope member 216 forms a wall extending angularly from the upper end 172 of the rearward end wall 156 downwardly to the side 86 of the opening 76. The angularly extending end slope members 216 cooperate with the first and the second floor panels 32 and 34 and portions of the first and the second side walls 150 and 152 to form a material bin space 290 within the trailer 10 for retaining the granular material and for guiding the granular material toward the hopper material bin space 108. The first and the second side flaps 220 and 222 and each extend a distance along one of the first and the second side walls 150 and 152 and a distance along one of the first and the second floor panels 32 and 34, and the first and the second side flaps 220 and 222 are each connected to one of the first and the second side walls 150 and 152 and one of the first and the second floor panels 32 and 34 to substantially reduce the possibility of any of the granular material from passing into some portion of the trailer 10 via spaces or gaps between the end slope members 216 and the trailer wall assembly 148. The support straps 224 connected to the end slope members 216 are constructed and disposed on the end slope members 216 to substantially reinforce the structural integrity, and some of the support straps 224 extend across portions of the first and the second side flaps 220 and 222 and across portions of the center section 218 overlapping a portion of the support straps 224 extending between the upper and the lower ends 226 and 228 of the center section 218. In one preferred form, the overlapping support straps 224 are located on the center section 218 to provide additional structural integrity near the largest load carrying portions of the center section 218.

The ventilation openings 206 are located on the first and the second side walls 150 and 152 and the first and the second floor panels 32 and 34 are sized such that the first and the second floor panels 32 and 34 each extend a distance from the lower toward the upper ends of the first and the second side walls 150 and 152 sufficient to cover the ventilation openings 206, thereby substantially preventing the leakage of any of the granular material from the material bin space 290 via such ventilation openings 206 in the granular material hauling position. The end slope members 218 each cooperate to retain the granular material within the material bin space 290 and to substantially reduce the possibility of any of the granular material from leaking through the ventilation openings 206 since the end slope members 216 are each connected to portions of the first and the second side walls 150 and 152 and to portions of the first and the second floor panels 32 and 34.

In the granular material hauling position, the roof cover 276 maybe connected in an assembled position covering a substantial portion of the opening defined via the upper end of the trailer wall assembly 148.

One of the salient aspects of the present invention is the particular construction of the trailer 10 which allows pre-constructed assemblies to be shipped to remote locations and assembled in a relatively quick and convenient manner at such remote location. In this manner shipping costs can be reduced and the various pre-constructed assemblies can be conveniently stored for final assembly at some future time.

The forward floor section 28 is pre-constructed as a complete assembly. The turntable 70 is connected to the forward floor section 28 in those instances where the forward floor section 28 is to be utilized to construct the trailer 10 and the turntable 70 is omitted in those instances where the forward floor section 28 is to be utilized to construct the trailer 10a, the forward floor section 28 being constructed to be pivotally connected to one end of the tongue 287 when utilized in the trailer 10a. The center floor section 30 is pre-constructed as a complete assembly, except the first and second floor panels 32 and 34 are separate unitary structures since they are removably disposed on the center floor section 30. The rearward floor section 36, the first side wall 150, the second side wall 152, the forward end wall 154 and the rearward end wall 156 are each pre-constructed as complete assemblies. In a preferred form, the rear and the front wheel assemblies 284 and 286 are shipped as separate assemblies or, in the alternative, the rear and the front wheel assemblies 284 and 286 can be shipped at a later time and from some other source since the rear and front wheel assemblies 284 and 286 are commercially available assemblies.

At the manufacturing facility or at some remote location depending on the circumstances, the various pre-constructed components and assemblies are connected to form the trailer 10 or the trailer 10a. To assemble the various pre-constructed components and assemblies, the forward floor section 28 is positioned adjacent the center floor section 30 with the second end 40 of the forward floor section 28 abutting the first end 46 of the center floor section 30. In this position, the ends of the floor support members 74 are connected to the channel beam 64, section 28 to the first end 46 of the center floor section 30.

The rearward floor section 36 is positioned adjacent the center floor section 30 with the first end 54 of the rearward floor section 36 abutting the second end 48 of the center floor section 30. In this position, the ends of the floor support member 74 are connected to the rib portion of the channel beam 64, thereby connecting the rearward floor section 36 to the second end 48 of the center floor section.

The trailer wall assembly 148 is then connected to the trailer frame 12 in a manner described before with the floor support flange 198 and the floor connecting extension 196 of the lowr extrusions 178 engaging portions of the forward, the center, and the rearward floor sections 28, 30, and 36 for positioning the first and second side walls 150 and 152 and the forward and the rearward end walls 154 and 156 in predetermined assembled positions on the forward, the center, and the rearward floor sections 28, 30, and 36. The corner support members 202 are connected to the trailer frame 12 and the corner support members 202 function to connect the walls 150, 152, 154, and 156 in a manner forming the trailer wall assembly 148 extending about the trailer frame 12. The walls 150, 152, 154, and 156 are connected to the trailer frame 12 by welding the floor support flange 198 to the adjacent portions of the floor sections 28, 30, and 36 via the bolt fasteners 200. In one form, the walls 150, 152, 154, and 156 are each connected to the floor sections 28, 30, and 36 via the bolt fasteners 200, the corner support members 202 are connected to the walls 150, 152, 154, and 156 and to the trailer frame 12, and then the floor support flange 198 is connected to the adjacent portions of the floor sections 28, 30, and 36 to augment the structural integrity.

In one preferred form, the rear and the front wheel assemblies 284 and 286 are connected to the trailer frame 12 prior to the connections of the trailer wall assembly 148 to the trailer frame 12.

The rear door 210 and the side door 214 are connected to the trailer wall assembly 148, and the cover support structures 270 including the associated beam 272 are connected to the trailer wall assembly 148.

The trailer construction of the present invention provides assemblies which can be connected to form the completed trailer in a relatively quick and convenient manner and in a manner such that the trailer can be assembled in a completed form by individuals having a minimum amount of training.

Changes maybe made in the construction and assembly of the various components, elements and assemblies of the present invention without departing frcm the spirit and the scope of the present invention as defined via the following claims.

What is claimed is:
1. A trailer apparatus, comprising:
 a trailer frame, having a first side, a second side, a forward end, a rearward end and a trailer frame opening formed through a portion thereof;
 a first side wall connected to the first side of the trailer frame and extending a distance upwardly therefrom having ventilation openings formed therethrough;
 a second side wall connected to the side of the trailer frame and extending a distance upwardly therefrom having ventilation openings formed therethrough;

a forward end wall connected to the forward end of the trailer frame;

a rearward end wall connected to the rearward end of the trailer frame, the first side wall, the second side wall, the rearward end wall and the forward end wall each cooperating to form a substantially continuous wall extending about the trailer frame;

a hopper, having an open upper end defining a hopper inlet opening and an open lower end, the space between the upper end of the lower end defining a hopper material bin space for retainingly storing granular material and the like, the upper end connected to the trailer frame in communication with a portion of the trailer frame opening;

a hopper door connected to the hopper and positionable in a closed position substantially closing the open lower end of the hopper cooperatingly retaining the granular material and the like within the hopper material bin space and an open position discharging the granular material and the like from the hopper material bin space via the open lower end of the hopper; and a trailer floor assembly positionable in a floor supported cargo hauling position and a granular material hauling position, comprising:

a first floor panel, having opposite ends, opposite sides, and an upper and a lower face removably supported on a portion of the trailer frame, the first floor panel being positionable in a floor supported cargo hauling position, a portion of the lower face of the first floor panel supportingly engaging a portion of the trailer frame and covering a portion of the trailer frame opening in the floor supported cargo hauling portion, the first floor panel being disposed generally adjacent the first side wall and covering the ventilation openings in the first side wall generally near the first floor panel in the granular material hauling position of the first floor panel;

a second floor panel, having opposite ends, opposite sides, and an upper and a lower surface removably supported on a portion of the trailer frame, the second floor panel being positionable in the floor supported cargo hauling position, a portion of the lower face of the second floor panel supportingly engaging a portion of the trailer frame and covering a portion of the trailer frame opening in the floor supported cargo hauling position, the second floor panel being disposed generally adjacent the second side wall and covering the ventilation openings in the second side wall generally near the second floor panel in the granular material hauling position of the second floor panel, the first and the second floor panels cooperating to form a portion of a trailer floor supporting surface for supporting floor supported cargo in the floor supported cargo hauling positions, and communication being established with a portion of the hopper material bin space via a portion of the trailer frame opening in the granular material hauling positions of the first and the second floor panels; and means removably connected to portions of the first and the second side walls and to the rearward and the forward end walls for cooperating with the first and the second floor panels to form a material bin space retaining granular material and the like in the granular material hauling positions of the first and the second floor panels.

2. The apparatus of claim 1 wherein the first and the second floor panels and the means for forming the material bin space are each defined further as cooperating to substantially emcompass the upper end of the hopper in the granular material hauling position.

3. The apparatus of claim 1 wherein the open upper end of the hopper cooperates with a portion of the trailer frame opening to form a hopper inlet opening, and wherein the length of the first and the second floor panels, generally between the opposite ends thereof, each substantially corresponds to the length of the hopper inlet opening and wherein the width of the first and the second floor panels each substantially corresponds to one-half of the width of the hopper inlet opening, the first and the second floor panels substantially covering the hopper inlet opening in the floor supported cargo hauling positions thereof.

4. The apparatus of claim 3 wherein the first floor panel is defined further as being supported generally near and extending a distance generally along a portion of the first side wall with one side disposed generally near the hopper inlet opening and extending generally along a portion of the length of the hopper inlet opening and the opposite side engaging a portion of the first side wall; and wherein the second floor panel is defined further as being supported generally near and extending a distance generally along a portion of the second side wall with one side disposed generally near the hopper inlet opening and extending generally along a portion of the length of the hopper inlet opening and the opposite side engaging a portion of the second side wall.

5. The apparatus of claim 4 wherein the means for forming the material bin space is defined further to include:

a pair of end slope members, each end slope member having a center section with an upper and a lower end, the upper end of the center section of one of the end slope members being removably connected to the forward end wall and the lower end of the center section being removably connected to the trailer frame near the hopper inlet opening, and the upper end of the center section of the other end slope member being removably connected to the rearward end wall and the lower end of the center section being removably connected to the trailer frame near the hopper inlet opening, the end slope members cooperating with the first and the second floor panels and portions of the first and the second side walls forming the material bin space in the granular material hauling position.

6. The apparatus of claim 5 wherein the end slope members are each defined further to include a first side flap with an upper end, a lower end and an edge, and a second side flap with an upper end, a lower end and an edge, the first side flap being formed via folding the end slope member along a fold-line extending between the first side flap and the center section and the second side flap being formed via folding the end slope member along a fold-line extending between the second side flap and the center section, the first side flap extending a distance along and being removably connected to a portion of one of the first and the second side walls and the second side flap extending a distance along and being removably connected to a portion of one of the first and the second side walls in the granular material hauling position.

7. The apparatus of claim 6 wherein the side slope members are each defined further as having the upper end of the first side flap removably connected to one of the first and the second side walls generally near the upper end thereof, and the upper end of the second side flap removably connected to one of the first and the second side walls generally near the upper end thereof.

8. The apparatus of claim 7 wherein each of the end slope members are further defined as being removably connected to one of the first and the second side walls generally near the edge of the first side flap and removably connected to the other of the first and the second side walls generally near the edge of the second side flap.

9. The apparatus of claim 8 wherein each end slope member is defined further as having a portion generally near the edge of the first side flap removably connected to a portion of the first floor panel and a portion generally near the edge of the second side flap removably connected to a portion of the second floor panel.

10. The apparatus of claim 1 defined further to include:
   means secured to the trailer frame cooperating with the first and the second floor panels to substantially cover the trailer frame opening in a floor supported cargo hauling position.

11. The apparatus of claim 1 wherein the trailer frame is defined further to include:
   a forward floor section, having a first and a second end and a first and a second side;
   a center floor section, having a first and a second end and a first and second side, the first end being disposed generally near and adjacent portions of the second end of the forward floor section and the center floor section being connected to the forward floor section generally along the adjacent portions of the second end of the forward floor section and the first end of the center floor section; and
   a rearward floor section, having a first and a second end and a first and a second side, the first end being disposed generally near and adjacent portions of the second end of the center floor section and the center floor section being connected to the rearward floor section generally along the adjacent portions of the second end of the center floor section and the first end of the rearward floor section.

12. The apparatus of claim 11 wherein the first side wall, the rearward end wall and the forward end wall are each defined further to include:
   at least one wall panel, each wall panel including: a pair of panels; and a core member disposed between the pair of panels, the core member being connected to the pair of panels; and
   means connecting some of the wall panels to form the first side wall, connecting some of the wall panels to form the second side wall, connecting some of the wall panels to form the forward end wall and connecting some of the side panels to form the rearward end wall; and
   means connecting the first side wall to the forward and the rearward end walls and connecting the second side wall to the forward and the rearward end walls.

13. The apparatus of claim 1 defined further to include
   a roof cover; and
   means for removably connecting the roof cover to the first and the second side walls, the roof cover extending between the first and the second side walls when connected thereto.

* * * * *

UNITED STATES PATENT OFFICE
CERTIFICATE OF CORRECTION

Patent No. 4,018,480  Dated April 19, 1977

Inventor(s) Jack C. Stone

It is certified that error appears in the above-identified patent and that said Letters Patent are hereby corrected as shown below:

Column 21, line 34, the word "portion" should be --position--.

Column 22, line 4, after the word "the", insert --open--.

Column 23, line 1, the word "side" should be --end--.

Signed and Sealed this twelfth Day of July 1977

[SEAL]

Attest:

RUTH C. MASON
Attesting Officer

C. MARSHALL DANN
Commissioner of Patents and Trademarks